May 11, 1948.　　　C. S. ROBINSON　　　2,441,509
VIBRATION DAMPENING MOUNT
Filed Nov. 2, 1944
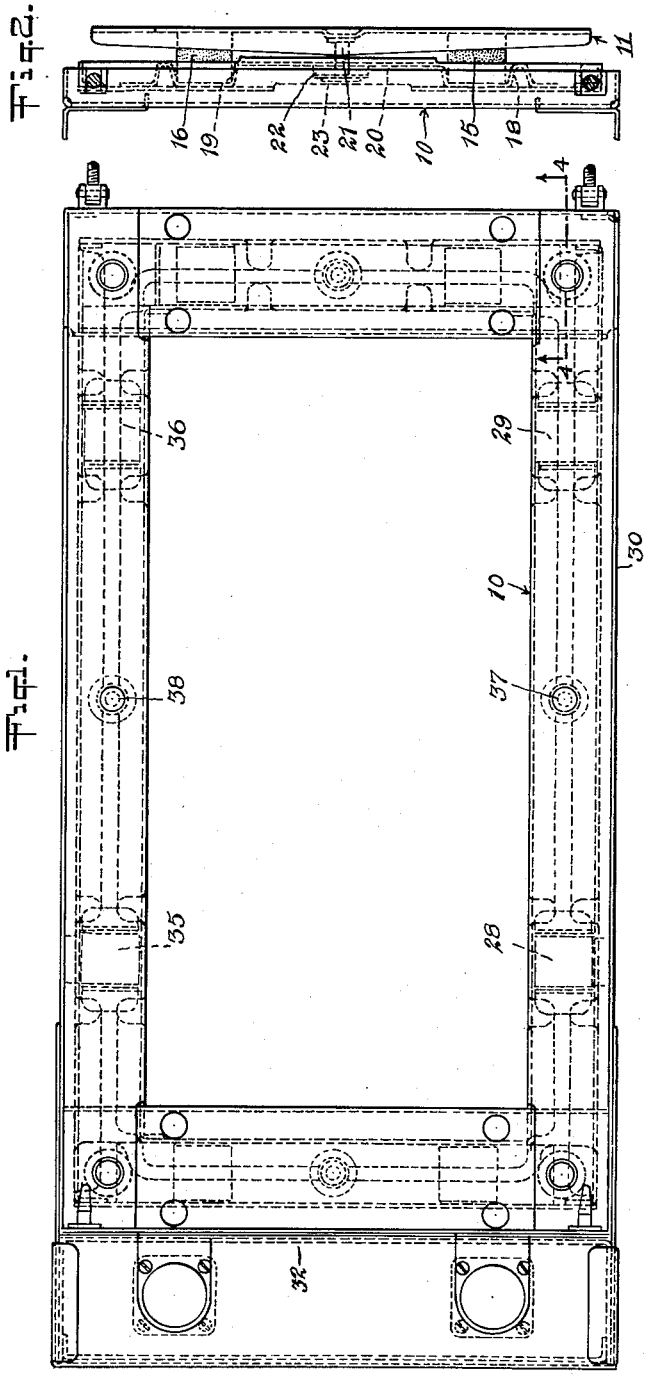
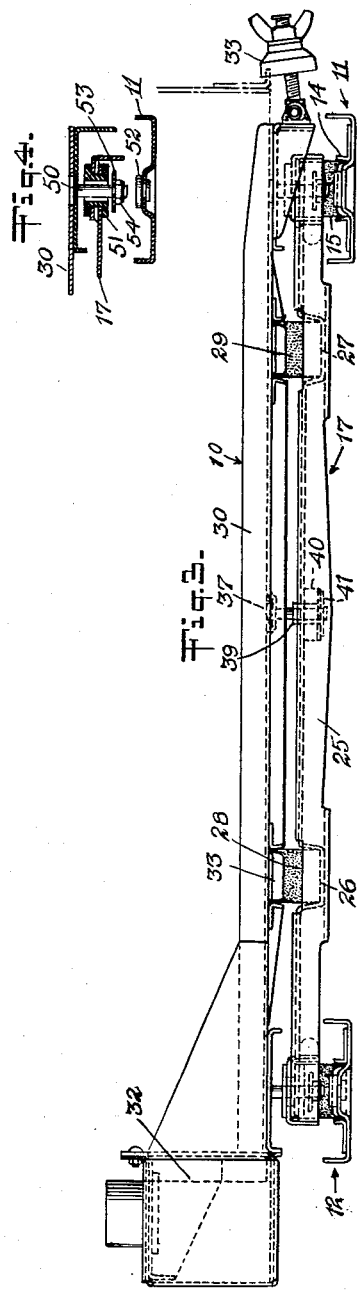
Inventor
Cecil S. Robinson Patented May 11, 1948

2,441,509

UNITED STATES PATENT OFFICE 2,441,509

VIBRATION DAMPENING MOUNT

Cecil S. Robinson, New York, N. Y., assignor of one-half to Dorothy H. Robinson, New York, N. Y.

Application November 2, 1944, Serial No. 561,606

9 Claims. (Cl. 248—22)

This invention relates to anti-vibration mountings and more particularly to mountings for instruments which are delicate in their nature or which require the elimination of vibration for their proper operation.

In the past, instruments of this type have been mounted at the corners with mountings which would cut down to some extent the vibrations in one plane but which would not absorb effectively all of the vibrations to which the instrument might be subjected.

An object of my invention is to provide a mount which will absorb substantially all vibrations regardless of the direction of the plane in which they occur and which will absorb all shocks or sudden movement and prevent their transmission to the mounted instrument. It is particularly important with various types of equipment embodying vacuum tubes be so mounted that vibrations will be absorbed by the mount and not transmitted to the instrument. This is particularly true where the installation is in a moving vehicle such as an airplane or in a stationary installation where vibrations are transmitted through the operation of machinery, gun concussions or other means.

A further object of my invention is to provide means for adjusting or changing the natural periods of the mount so as to avoid resonance peaks within the operating range, and to make the general type of mount adaptable to different types and distributions of loading in various installations having different vibration characteristics.

Other objects and advantages of my invention will become apparent from the accompanying drawings and description.

In the drawings—

Figure 1 is a plan view of a mount embodying my invention;

Fig. 2 is an end view thereof;

Fig. 3 is a side elevation of a mount embodying my invention;

Fig. 4 is a detailed cross sectional view taken on the line 4—4 of Fig. 1.

My mount 10 is provided with a pair of base brackets 11 and 12, one at either end of the mount. Brackets 11 and 12 are provided with angle members 14 adapted to form a cushion positioning means. The brackets 11 and 12 are substantially identical and the description accordingly will be specifically directed to the bracket assembly in connection with the bracket 11.

Mounted in the positioning means 14 are a pair of cushions 15 and 16. The cushions 15 and 16 support the intermediate frame 17. The intermediate frame 17 is so formed that a pocket 18 is provided to accommodate the cushion 15 and a similar pocket 19 to accommodate the cushion 16 while the central portion thereof 20 is depressed. A retaining stud or pin 21 is mounted in bracket 11 and extends through the intermediate frame 17 to limit the movement of the intermediate frame in a vertical direction. A pad 22 is mounted above the frame on the pin 21 and a plate 23 holds the pad 22 in place. The opening in the intermediate frame 17 is considerably larger than pin 21 so that there is no metallic contact between the pin and the frame. The pin 21 is of sufficient length so that the intermediate frame may move in a vertical direction for some little distance without being restrained by the buffer pad 22.

The sides 25 of the intermediate frame 17 are depressed at 26 and 27 to form pockets adapted to receive the cushions 28 and 29. The tray 30 is adapted to hold the equipment when mounted and is provided with suitable fixtures therefor such as the dust cover assembly 32 and the clamps 33'. The bottom of the tray 30 is provided with cushion positioning members 33 which are slightly flared so as not to restrict the cushions. The tray 30 is supported on the cushions 28 and 29, 35 and 36. In order to limit the vertical movement of the tray 30 retaining pins 37 and 38 are provided. These pins may be provided with a sleeve 39 on which is mounted the buffer pad 40 held in place by the plate 41. The sleeve 39 is considerably larger in diameter than the pin and is preferably made of insulating material so that there is no metallic contact between the pins and the intermediate frame and the pin is of sufficient length to allow free movement of the tray on the supporting cushions.

Although not a necessary element of my invention, additional pins 50 may be provided in the corners of the tray 30 to extend through a buffer or large grommet 51 mounted on the intermediate frame 17, while a button 52 may be mounted on the bracket member 11. A plate 53 held in place by the nut 54 tends to keep the parts in proper relation. This construction eliminates the possibility of the members clashing due to sudden severe strains or action such as might occur in the landing of a plane or in the event of explosions.

It will be appreciated that while I have indicated the use of rubber cushions any resilient material or vibration dampening material such as felt springs and similar devices may be used. It will also be appreciated that the exact position of my cushion means may be varied in order to meet conditions without departing from the spirit of my invention.

Not only have I eliminated the common four-point suspension through which vibrations are transmitted but I have provided a structure in which the space occupied by my mounting is no greater than that used in the conventional four-point suspension. It will be noted that I have used cushions in series with a primary and secondary pair of cushions. In the structure shown cushions 15 and 16 constitute the primary cushions while the cushions 28 and 29, 35 and 36, the secondary cushions. All of the vibrations and shocks, whether vertical, lateral or longitudinal will be absorbed to a great extent by the primary cushions and the secondary cushions will absorb the greater portion of the residual vibration so that the amplitude remaining which may be passed along to the object supported, will be generally less than five percent of the amplitude of the original exciting impulse.

It will be further noted that both the primary and secondary cushions are located at particular determined distances from the neutral axes of the mass to be supported, the primary cushions being mounted at what is found to be the best distance from the longer neutral axis while the secondary cushions are mounted at what is found to be the best distance from the shorter neutral axis. In any particular installation the best distances from the neutral axes are necessarily dependent upon the natural characteristics of the object to be supported. The further away from the neutral axis the cushions are placed the greater is the stability but the higher the resonance point. The nearer the cushions are placed to the neutral axis the lower the resonance point; and the construction of the mount is such that these highly important adjustments can be taken into consideration, and provided for.

In the structure shown, the cushions are so placed as to transmit the least vibration while at the same time afford the greatest stability, in any installation of the type described, without alteration of the general principles involved in the invention.

I claim:

1. A vibration absorbing mounting including an object to be supported, a pair of base members at opposite ends of said object, resilient members supported by said base members, a rigid intermediate frame on said resilient members, and a pair of resilient members on each side of said intermediate frame supporting said object.

2. A vibration absorbing mounting for supporting a rectangular tray member including a pair of base members, one at each end of said tray member, a pair of resilient members on each of said base members, a rigid intermediate frame mounted on said resilient members, and a pair of resilient members on each side of said intermediate member supporting said tray.

3. A vibration absorbing mounting comprising a tray member, a pair of base members one at each end of said tray member, a rigid intermediate member, a plurality of resilient cushions between said base members and said intermediate member, and between said intermediate member and said tray member, the resilient members between said intermediate member and said tray member being mounted at right angles to those between said base member and said intermediate member.

4. A vibration absorbing mount including a rectangular tray assembly, a pair of base members at either end of said rectangular tray assembly, resilient members in said base members, a rigid intermediate frame extending between said base members, said intermediate frame having portions of the sides thereof depressed to form pockets, and resilient members in said pockets supporting said tray assembly.

5. A vibration absorbing mount including a rectangular tray assembly, a pair of base members at either end of said rectangular tray assembly, resilient members in said base members, a rigid intermediate frame extending between said base members, said intermediate frame having portions of the sides thereof depressed to form pockets, resilient members in said pockets supporting said tray assembly and insulated restraining means to restrict the movement of said parts within predetermined limits.

6. In a vibration absorbing mount a tray member, a base member at opposite ends thereof, a plurality of resilient cushions between said base member and said tray member, certain of said cushions being separated by a rigid intermediate member whereby said tray member is supported by cushions mounted on said intermediate member having their axis in one direction and said intermediate member is supported by cushions mounted on said base members having their vertical axis at right angles to said tray supporting cushions.

7. A vibration absorbing mounting, a base member at opposite ends thereof, a pair of resilient cushions mounted adjacent one neutral axis of the mass to be supported, a rigid intermediate frame supported by said cushions, and an additional pair of resilient cushions mounted adjacent the other neutral axis of the mass to be supported at either end thereof.

8. A vibration absorbing mount including a pair of base members at either end thereof, each of said base members having a pair of resilient cushions, each of said pair of cushions being positioned at a calculated distance from one neutral axis of the mass to be supported, a rigid intermediate frame member mounted on said cushions, two additional pairs of resilient cushions mounted on said intermediate frame member, each of said cushions being positioned a calculated distance from another neutral axis of the mass to be supported, and a tray mounted on said last-mentioned cushions to support said mass.

9. A vibration absorbing mounting including an object to be supported, a base member at opposite ends of said object, a pair of resilient members supported by each base member, a rigid intermediate frame on said resilient members, and a pair of resilient members on each side of said intermediate frame supporting said object, each pair of resilient members being positioned about a neutral axis of the object to be supported and a calculated distance therefrom.

CECIL S. ROBINSON.

REFERENCES CITED

The following references are of record in the file of this patent:

UNITED STATES PATENTS

| Number | Name | Date |
|---|---|---|
| 2,235,158 | Krenske | Mar. 18, 1941 |
| 2,338,323 | Fink | Jan. 14, 1944 |

FOREIGN PATENTS

| Number | Country | Date |
|---|---|---|
| 313,871 | Great Britain | Apr. 23, 1929 |